US012785418B2

(12) United States Patent
Chen et al.

(10) Patent No.: US 12,785,418 B2
(45) Date of Patent: Nov. 3, 2026

(54) CONSTANT-CURRENT DISCHARGE DEVICE AND POWER SUPPLY HAVING THE SAME

(71) Applicant: FSP TECHNOLOGY INC., Taoyuan City (TW)

(72) Inventors: Chao-An Chen, Taoyuan City (TW); Chou-Pao Liao, Taoyuan City (TW)

(73) Assignee: FSP TECHNOLOGY INC., Taoyuan City (TW)

(*) Notice: Subject to any disclaimer, the term of this patent is extended or adjusted under 35 U.S.C. 154(b) by 19 days.

(21) Appl. No.: 18/906,472

(22) Filed: Oct. 4, 2024

(65) Prior Publication Data

US 2025/0253702 A1 Aug. 7, 2025

(30) Foreign Application Priority Data

Feb. 1, 2024 (TW) ................................ 113104003

(51) Int. Cl.
*H02J 7/34* (2006.01)
*H02J 7/60* (2026.01)
*H02M 1/42* (2007.01)
*H02M 1/44* (2007.01)

(52) U.S. Cl.
CPC .............. *H02J 7/345* (2013.01); *H02J 7/663* (2026.01); *H02M 1/4208* (2013.01); *H02M 1/44* (2013.01); *H02J 2207/20* (2020.01)

(58) Field of Classification Search
CPC .... H02J 7/663; H02J 2207/20; H02M 1/4208; H02M 1/44
USPC .......................................................... 307/116
See application file for complete search history.

(56) References Cited

U.S. PATENT DOCUMENTS

2023/0124976 A1* 4/2023 Feng ................... G01R 31/364 702/63

FOREIGN PATENT DOCUMENTS

CN 106992565 B * 8/2023 ................ H02J 7/00

* cited by examiner

*Primary Examiner* — Rexford N Barnie
*Assistant Examiner* — Swarna N Chowdhuri
(74) *Attorney, Agent, or Firm* — MUNCY, GEISSLER, OLDS & LOWE, P.C.

(57) ABSTRACT

A constant-current discharge device includes a discharge voltage detection circuit, a voltage level adjustment circuit, a constant-current drive circuit, and a constant-current circuit. The discharge voltage detection circuit is connected between a positive terminal and a negative terminal of a DC voltage, and receives the DC voltage. The voltage level adjustment circuit is connected to the discharge voltage detection circuit, and provides a supply voltage and decides a discharge current. The constant-current drive circuit is connected to the discharge voltage detection circuit and the voltage level adjustment circuit, and provides a drive voltage. The constant-current circuit is connected to the voltage level adjustment circuit and the constant-current drive circuit, and is supplied by the supply voltage and is driven by the drive voltage. When the DC voltage is less than a voltage threshold, the constant-current circuit performs a constant-current discharge according to the discharge current.

7 Claims, 4 Drawing Sheets

CONSTANT-CURRENT DISCHARGE DEVICE AND POWER SUPPLY HAVING THE SAME

BACKGROUND

Technical Field

The present disclosure relates to a discharge device and a power supply having the same, and more particularly to a constant-current discharge device and a power supply having the same.

Description of Related Art

The statements in this section merely provide background information related to the present disclosure and do not necessarily constitute prior art.

As the current power supply strives for enhanced efficiency and reduced energy consumption, the loss of the power supply itself is diminishing. This results in a residual voltage on the capacitor when the power supply is deactivated (AC OFF), and it requires an extended period for this residual high voltage to dissipate (for instance, up to ten minutes) before it reaches a safe voltage level. It is therefore possible that personnel engaged in maintenance, system operation or other relevant roles may be exposed to the risk of electric shock during the discharge period. Furthermore, such exposure may also result in damage to components.

Therefore, how to design a constant-current discharge device and a power supply having the same to solve the problems and technical bottlenecks in the existing technology has become a critical topic in this field.

SUMMARY

An objective of the present disclosure is to provide a constant-current discharge device to solve the problems and technical bottlenecks in the existing technology.

In order to achieve the above-mentioned objective, the constant-current discharge device includes a discharge voltage detection circuit, a voltage level adjustment circuit, a constant-current drive circuit, and a constant-current circuit. The discharge voltage detection circuit is connected between a positive terminal and a negative terminal of a DC voltage, and receives the DC voltage. The voltage level adjustment circuit is connected to the discharge voltage detection circuit, and the voltage level adjustment circuit provides a supply voltage and decide a discharge current. The constant-current drive circuit is connected to the discharge voltage detection circuit and the voltage level adjustment circuit, and the constant-current drive circuit provides a drive voltage. The constant-current circuit is connected to the voltage level adjustment circuit and the constant-current drive circuit, and the constant-current circuit is supplied power by the supply voltage and driven by the drive voltage. When the DC voltage is less than a voltage threshold, the constant-current circuit performs a constant-current discharge according to the discharge current.

In one embodiment, when the DC voltage is greater than or equal to the voltage threshold, the constant-current circuit disables performing the constant-current discharge.

In one embodiment, the discharge voltage detection circuit includes a voltage-regulating unit, a voltage-dividing unit, and a first switch. The voltage-regulating unit receives the DC voltage and provides a regulated voltage. The voltage-dividing unit is connected to the voltage-regulating unit, and the voltage-dividing unit receives the regulated voltage and divides the regulated voltage to provide a divided voltage. The first switch is connected to the voltage-dividing unit, and the first switch receives the divided voltage and controls the turning on and turning off of the first switch.

In one embodiment, the discharge voltage detection circuit further includes a first protection unit. The first protection unit is connected to the voltage-dividing unit, and the first protection unit receives the divided voltage and regulates the divided voltage to protect the first switch.

In one embodiment, the voltage level adjustment circuit includes a first resistor loop. The first resistor loop includes at least one resistor, and is connected between the discharge voltage detection circuit and the constant-current circuit, and the first resistor loop receives the DC voltage, adjusts the supply voltage, and decides the discharge current.

In one embodiment, the constant-current drive circuit includes a second resistor loop. The second resistor loop includes at least one resistor, and provides the drive voltage of driving the constant-current circuit.

In one embodiment, the constant-current drive circuit further includes a second protection unit. The second protection unit is connected to the second resistor loop, and the second protection unit protects the constant-current circuit.

In one embodiment, the constant-current circuit includes a second switch and a third switch. The second switch is connected to the voltage level adjustment circuit, and the second switch receives the supply voltage. The third switch is connected to the second switch. When the second switch is turned on, the third switch provides a discharge path so that the discharge current flows through the discharge path to perform the constant-current discharge.

Another objective of the present disclosure is to provide a power supply to solve the problems and technical bottlenecks in the existing technology.

In order to achieve the above-mentioned objective, the power supply receives an AC input voltage and converts the AC input voltage to provide a DC output voltage. The power supply includes an AC side circuit, a DC bus, a bus capacitor, a DC side circuit, and a constant-current discharge device. The AC side circuit receives the AC input voltage and converts the AC input voltage into a DC voltage. The DC bus is connected to an output side of the AC side circuit. The bus capacitor is connected to the DC bus, and builds the DC voltage on the DC bus. The DC side circuit is connected to the DC bus, and converts the DC voltage into the DC output voltage. The constant-current discharge device is connected in parallel to the bus capacitor and an input side of the DC side circuit, and the constant-current discharge device receives the DC voltage. When the DC voltage is less than a voltage threshold, the constant-current discharge device discharges the energy stored in the bus capacitor at a constant current.

In one embodiment, the constant-current discharge device includes a discharge voltage detection circuit, a voltage level adjustment circuit, a constant-current drive circuit, and a constant-current circuit. The discharge voltage detection circuit is connected between a positive terminal and a negative terminal of a DC voltage, and receives the DC voltage. The voltage level adjustment circuit is connected to the discharge voltage detection circuit, and the voltage level adjustment circuit provides a supply voltage and decide a discharge current. The constant-current drive circuit is connected to the discharge voltage detection circuit and the voltage level adjustment circuit, and the constant-current drive circuit provides a drive voltage. The constant-current circuit is connected to the voltage level adjustment circuit and the constant-current drive circuit, and the constant-current circuit is supplied power by the supply voltage and driven by the drive voltage. When the DC voltage is less than a voltage threshold, the constant-current circuit performs a constant-current discharge according to the discharge current.

In one embodiment, when the DC voltage is greater than or equal to the voltage threshold, the constant-current circuit disables performing the constant-current discharge.

In one embodiment, the discharge voltage detection circuit includes a voltage-regulating unit, a voltage-dividing unit, and a first switch. The voltage-regulating unit receives the DC voltage and provides a regulated voltage. The voltage-dividing unit is connected to the voltage-regulating unit, and the voltage-dividing unit receives the regulated voltage and divides the regulated voltage to provide a divided voltage. The first switch is connected to the voltage-dividing unit, and the first switch receives the divided voltage and controls the turning on and turning off of the first switch.

In one embodiment, the discharge voltage detection circuit further includes a first protection unit. The first protection unit is connected to the voltage-dividing unit, and the first protection unit receives the divided voltage and regulates the divided voltage to protect the first switch.

In one embodiment, the voltage level adjustment circuit includes a first resistor loop. The first resistor loop includes at least one resistor, and is connected between the discharge voltage detection circuit and the constant-current circuit, and the first resistor loop receives the DC voltage, adjusts the supply voltage, and decides the discharge current.

In one embodiment, the constant-current drive circuit includes a second resistor loop. The second resistor loop includes at least one resistor, and provides the drive voltage of driving the constant-current circuit.

In one embodiment, the constant-current drive circuit further includes a second protection unit. The second protection unit is connected to the second resistor loop, and the second protection unit protects the constant-current circuit.

In one embodiment, the constant-current circuit includes a second switch and a third switch. The second switch is connected to the voltage level adjustment circuit, and the second switch receives the supply voltage. The third switch is connected to the second switch. When the second switch is turned on, the third switch provides a discharge path so that the discharge current flows through the discharge path to perform the constant-current discharge.

In one embodiment, the AC side circuit includes an electromagnetic interference filter circuit, an input rectifier and filter circuit, and a power factor correction conversion circuit. The electromagnetic interference filter circuit receives the AC input voltage and convert the AC input voltage into a filtered voltage. The input rectifier and filter circuit is connected to the electromagnetic interference filter circuit, and the input rectifier and filter circuit receives the filtered voltage and converts the filtered voltage into a rectified filtered voltage. The power factor correction conversion circuit is connected to the input rectifier and filter circuit, and the power factor correction conversion circuit converts the rectified filtered voltage into the DC voltage.

In one embodiment, the DC side circuit includes a DC-to-DC conversion circuit and an output rectifier and filter circuit. The DC-to-DC conversion circuit receives the DC voltage and convert the DC voltage into a converted voltage. The output rectifier and filter circuit is connected to the DC-to-DC conversion circuit, and the output rectifier and filter circuit converts the converted voltage into the DC output voltage.

Accordingly, the present disclosure has the following features and advantages: 1. The constant-current discharge device of the present disclosure can be applied to various power supplies for the purpose of discharging energy stored in capacitors; 2. The constant-current discharge device can be installed on an independent circuit board to form a modular design, and then connected in parallel to the DC bus of the power supply to provide the constant-current discharge; 3. The transistor (power) switch is the means by which active constant-current discharge is achieved, and the discharge current can be designed according to practical needs, and may be modified according to the specific requirements of the user; 4. By discharging the residual voltage on the capacitor, the risk of electric shock and electric shock to maintenance personnel or system operators is avoided, and component damage is avoided; 5. In comparison to the conventional manner, which requires a considerable amount of time (approximately 30 minutes) to complete the release of residual high voltage, the active constant-current discharge disclosed in the present disclosure can achieve complete energy release in a significantly shorter time (approximately 3 minutes); 6. The present disclosure offers the advantage of low loss (i.e., high efficiency) and high energy saving through the active constant-current discharge of the power supply.

It is to be understood that both the foregoing general description and the following detailed description are exemplary, and are intended to provide further explanation of the present disclosure as claimed. Other advantages and features of the present disclosure will be apparent from the following description, drawings, and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Figure 1:
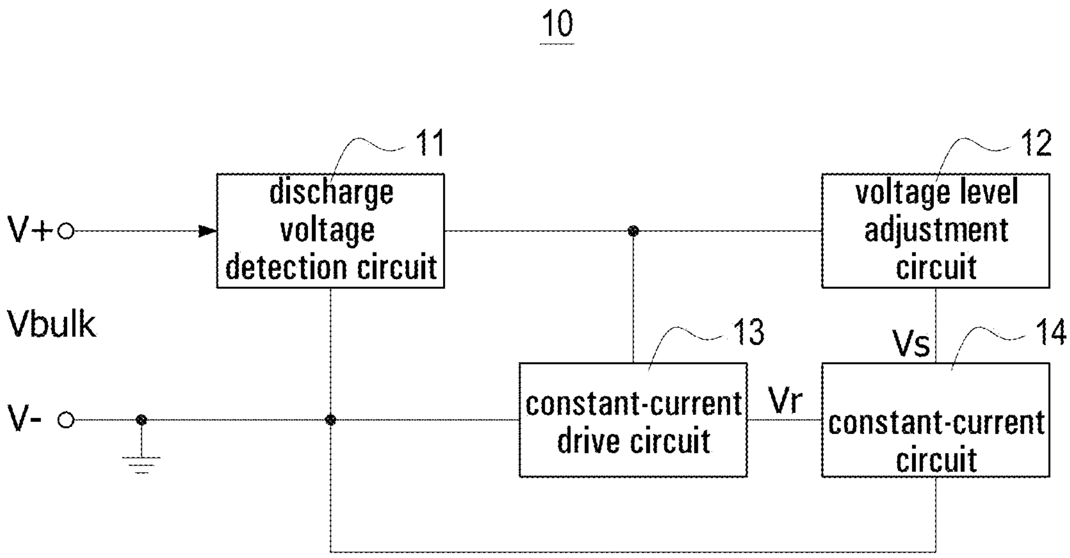
FIG. 1 is a block circuit diagram of a constant-current discharge device according to the present disclosure.

Reference will now be made to the drawing figures to describe the present disclosure in detail. It will be understood that the drawing figures and exemplified embodiments of present disclosure are not limited to the details thereof.

Please refer to FIG. 1, which shows a block circuit diagram of a constant-current discharge device according to the present disclosure. The constant-current discharge device 10 includes a discharge voltage detection circuit 11, a voltage level adjustment circuit 12, a constant-current drive circuit 13, and a constant-current circuit 14.

The discharge voltage detection circuit 11 is connected between a positive terminal V+ and a negative terminal V− of a DC voltage Vbulk, and receives the DC voltage Vbulk.

In particular, the DC voltage Vbulk is a DC voltage built on a capacitor (not shown). The voltage level adjustment circuit 12 is connected to the discharge voltage detection circuit 11. The voltage level adjustment circuit 12 is used to provide a supply voltage Vs, and decides a discharge current.

The constant-current drive circuit 13 is connected between the discharge voltage detection circuit 11 and the voltage level adjustment circuit 12. The constant-current drive circuit 13 is used to provide a drive voltage Vr. The constant-current circuit 14 is connected to the voltage level adjustment circuit 12 and the constant-current drive circuit 13. The constant-current circuit 14 is supplied power by the supply voltage Vs, and driven by the drive voltage Vr.

Therefore, when the DC voltage Vbulk is less than a voltage threshold Vth, the constant-current circuit 14 performs a constant-current discharge according to the magnitude of the discharge current. On the contrary, when the DC voltage Vbulk is greater than or equal to the voltage threshold Vth, the constant-current circuit 14 disables performing the constant-current discharge. Incidentally, the above-mentioned determination that the DC voltage Vbulk is less than the voltage threshold Vth, or greater than or equal to the voltage threshold Vth does not limit the present disclosure, that is, the determination that the DC voltage Vbulk is greater than the voltage threshold Vth, or less than or equal to the voltage threshold Vth, may also enable the constant-current circuit 14 to perform the constant-current discharge and disable the constant-current circuit 14 to perform the constant-current discharge.

Figure 2:
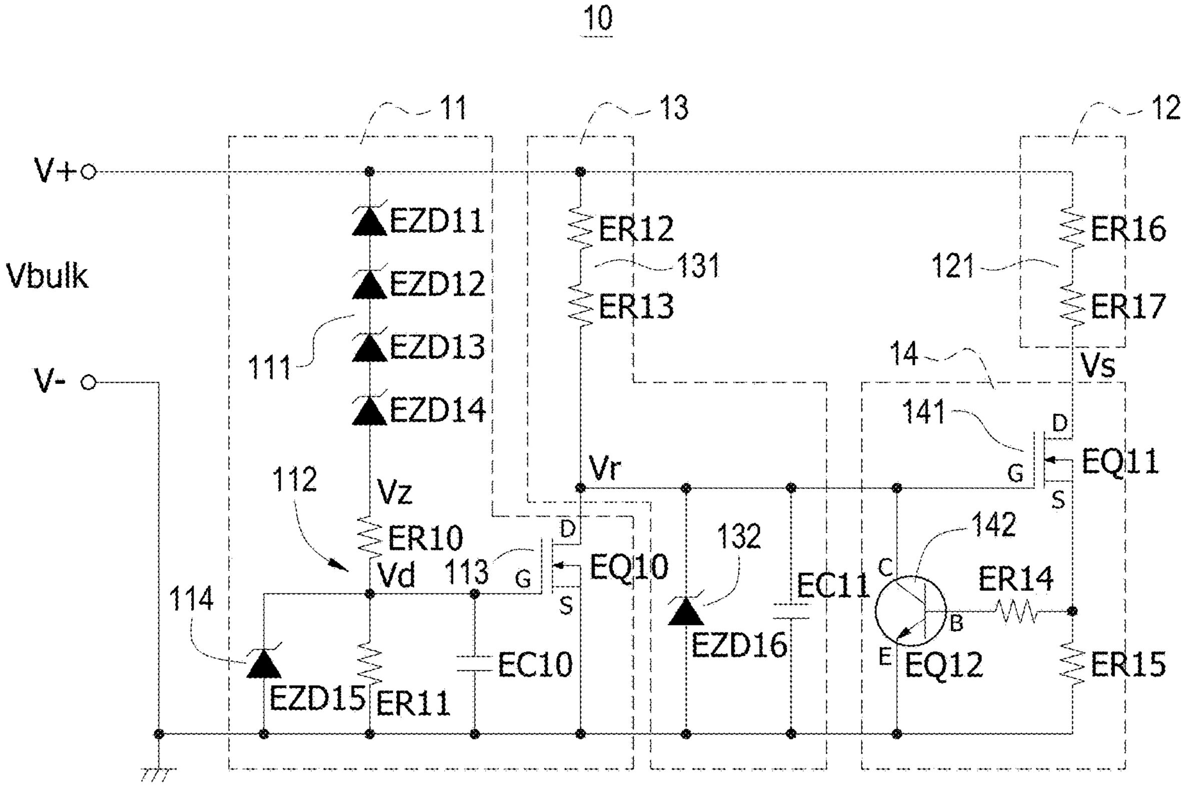
FIG. 2 is a circuit diagram of the constant-current discharge device according to the present disclosure.

Please refer to FIG. 2, which shows a circuit diagram of the constant-current discharge device according to the present disclosure. The following sections will provide detailed descriptions of the constant-current discharge device 10, with a particular focus on each circuit. As shown in FIG. 2, the discharge voltage detection circuit 11 includes a voltage-regulating unit 111, a voltage-dividing unit 112, and a first switch 113 (EQ10). The voltage-regulating unit 111 receives the DC voltage Vbulk and provides a regulated voltage Vz. In one embodiment, the voltage-regulating unit 111 includes a plurality of Zener diodes connected in series. As shown in FIG. 2, the voltage-regulating unit 111 includes four Zener diodes EZD11-EZD14, and it is assumed that the reverse breakdown voltage of each Zener diode is 75 volts, although this does not constitute a limitation of the present disclosure. Therefore, when the Zener diodes are connected in series and undergo Zener breakdown due to the reverse voltage, a stable voltage of 300 volts can be provided.

The voltage-dividing unit 112 is connected to the voltage-regulating unit 111, and the voltage-dividing unit 112 receives the regulated voltage Vz and divides the regulated voltage Vz to provide a divided voltage Vd. Specifically, the voltage-dividing unit 112 includes a first voltage-dividing resistor ER10 and a second voltage-dividing resistor ER11. That is, the regulated voltage Vz is divided through a resistance ratio relationship between the first voltage-dividing resistor ER10 and the second voltage-dividing resistor ER11, thereby generating the divided voltage Vd on the second voltage-dividing resistor ER11, and therefore this can be expressed as $Vd=Vz*(ER11/(ER10+ER11))$.

The first switch 113 (EQ10) is connected to the voltage-dividing unit 112, and the first switch 113 (EQ10) receives the divided voltage Vd to control the turning on and turning off of the first switch 113 (EQ10). In addition, the discharge voltage detection circuit 11 further includes a first protection unit 114 (EZD15). The first protection unit 114 (EZD15) is connected to the voltage-dividing unit 112, and the first protection unit 114 (EZD15) receives the divided voltage Vd and regulated the divided voltage Vd to protect the first switch 113 (EQ10). The detailed operations and action principles of the discharge voltage detection circuit 11 will be described in detail later.

As shown in FIG. 2, the voltage level adjustment circuit 12 includes a first resistor loop 121. The first resistor loop 121 includes at least one resistor ER16, ER17. The first resistor loop 121 is connected between the discharge voltage detection circuit 11 and the constant-current circuit 14, and the first resistor loop 121 receives the DC voltage Vbulk, adjusts the supply voltage Vs, and decide the magnitude of the discharge current. The detailed operations and action principles of the voltage level adjustment circuit 12 will be described in detail later.

As shown in FIG. 2, the constant-current drive circuit 13 includes a second resistor loop 131. The second resistor loop 131 includes at least one resistor ER12, ER13, and provides the drive voltage Vr of driving the constant-current circuit 14. In addition, the constant-current drive circuit 13 further includes a second protection unit 132 (EZD16). The second protection unit 132 (EZD16) is connected to the second resistor loop 131, and protects the constant-current circuit 14. The detailed operations and action principles of the constant-current drive circuit 13 will be described in detail later.

As shown in FIG. 2, the constant-current circuit 14 includes a second switch 141 (EQ11) and a third switch 142 (EQ12). The second switch 141 (EQ11) is connected to the voltage level adjustment circuit 12, and the second switch 141 (EQ11) receives the supply voltage Vs. The third switch 142 is connected to the second switch 141 (EQ11). When the second switch 141 (EQ11) is turned on, the third switch 142 (EQ12) provides a discharge path so that the discharge current flows through the discharge path to perform the constant-current discharge. The detailed operations and action principles of the constant-current circuit 14 will be described in detail later.

In the following, detailed operations and action principles of the discharge voltage detection circuit 11, the voltage level adjustment circuit 12, the constant-current drive circuit 13, and the constant-current circuit 14 will be described with reference to FIG. 3 and hypothetical data.

Figure 3:
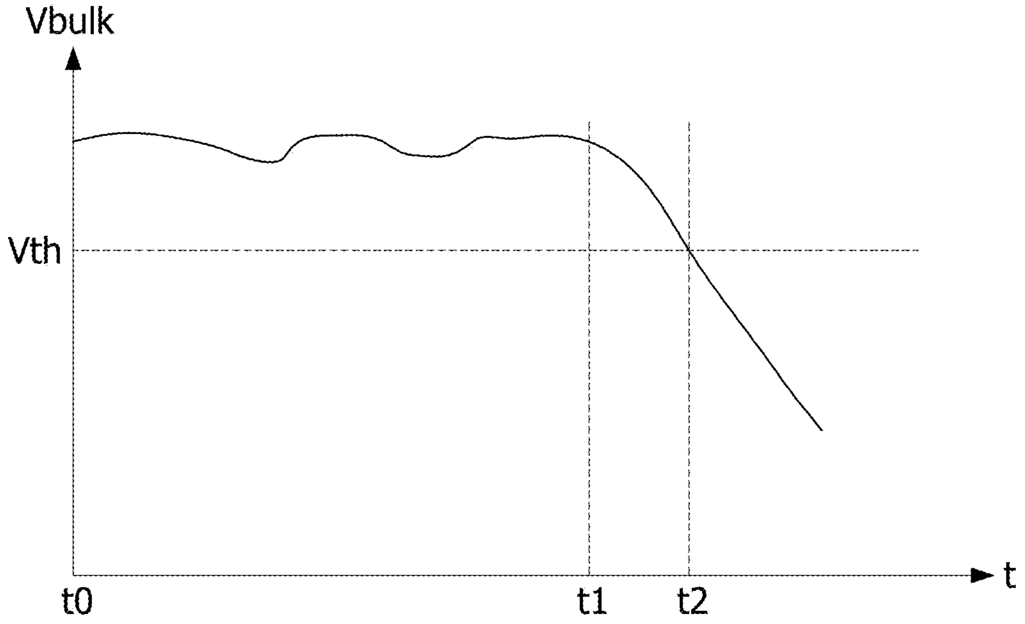
FIG. 3 is a schematic waveform diagram of the constant-current discharge device controlled by a DC voltage according to the present disclosure.

Please refer to FIG. 3, which shows a schematic waveform diagram of the constant-current discharge device controlled by a DC voltage according to the present disclosure. It is assumed that under a normal operation, for example, when the input power of the power supply is operating within normal parameters, the DC voltage Vbulk is approximately 400 volts, and the voltage threshold Vth is set to 300 volts (an ideal value for the purposes of convenience in explanation) or 310 volts (an actual value when considering the component characteristics). From time t0 to time t1, the input power of the power supply operates in a normal manner, although the DC voltage Vbulk may experience a voltage drop (approximately 10 volts) due to the loading condition or the input power supply condition, such voltage drops occur during normal operation. Therefore, in this situation, the DC voltage Vbulk will not be less than (below) the voltage threshold Vth so that the constant-current circuit 14 disables performing the constant-current discharge, that is, the constant-current discharge of the constant-current circuit 14 is not activated.

Please refer to FIG. 2 and FIG. 3, from time t0 to time t1, the input power of the power supply normally supplies power so that the DC voltage Vbulk is approximately 400 volts. Since the voltage-regulating unit 111 includes four Zener diodes EZD11-EZD14, in which the reverse breakdown voltage of each Zener breakdown is assumed to be 75 volts, the DC voltage Vbulk causes Zener breakdown of the series-connected Zener diodes under the action of the reverse voltage, thereby causing the voltage-regulating unit 111 to provide a stable voltage of 300 volts. That is, the voltage-regulating unit 111 provides a stabilizing voltage Vz of 300 volts. Therefore, the voltage-dividing unit 112 designs the resistance values of the first voltage-dividing resistor ER10 and the second voltage-dividing resistor ER11 so that the divided voltage Vd acquired after dividing the regulated voltage Vz is about 15 volts. In particular, the divided voltage Vd of 15 volts can turn on the first switch 113 (EQ10). In this embodiment, the first switch 113 (EQ10) is an n-type MOSFET transistor switch, but this does not limit the present disclosure.

Moreover, the reverse breakdown voltage of the first protection unit 114 (EZD15) may be designed to be 15 volts. Therefore, once the divided voltage Vd divided by the voltage-dividing unit 112 exceeds 15 volts, the first protection unit 114 (EZD15) will provide a stable voltage of 15 volts to prevent excessive voltage from driving the first switch 113 (EQ10), thereby preventing the first switch 113 (EQ10) from being damaged and protecting the first switch 113 (EQ10).

Once the first switch 113 (EQ10) is turned on, the drain voltage of the first switch 113 (EQ10) is 0 volts at ground. Therefore, this voltage is provided to the gate of the second switch 141 (EQ11) of the constant-current circuit 14, which will turn off the second switch 141 (EQ11). In other words, the drive voltage Vr provided by the constant-current drive circuit 13 to drive the constant-current circuit 14 is 0 volts, and therefore the constant-current circuit 14 cannot be driven to operate. In this embodiment, the second switch 141 (EQ11) is an n-type MOSFET transistor switch, but this does not limit the present disclosure. Once the second switch 141 (EQ11) is turned off, the constant-current circuit 14 will be disabled for performing the constant-current discharge, that is, the constant-current discharge of the constant-current circuit 14 will not be activated.

Please refer to FIG. 2 and FIG. 3, after time t1, it is assumed that the power supply is shut down, or the input power of the power supply is powered off or continues abnormal power supply so that the DC voltage Vbulk gradually decreases from about 400 volts. Until time t2, the DC voltage Vbulk is less than the voltage threshold Vth (i.e., 300 volts), and therefore the constant-current circuit 14 enables the constant-current discharge, that is, the constant-current discharge of the constant-current circuit 14 is activated so that the constant-current circuit 14 can perform the constant-current discharge according to the magnitude of the discharge current.

When the DC voltage Vbulk is less than 300 volts, since the DC voltage Vbulk cannot cause Zener breakdown of the series-connected Zener diodes under the action of the reverse voltage, the regulated voltage Vz at this time will only be the sum of the forward voltages of the four Zener diodes EZD11-EZD14, which is approximately 2.8 volts. Therefore, after the voltage-dividing unit 112 further divides the regulated voltage Vz of 2.8 volts, the acquired divided voltage Vd will not be enough to drive the first switch 113 (EQ10) to turn on.

Once the first switch 113 (EQ10) is turned off, the drive voltage Vr provided by the constant-current drive circuit 13 to drive the constant-current circuit 14 is no longer 0 volt, but is enough to drive the second switch 141 (EQ11) to turn on. In particular, when the first switch 113 (EQ10) is turned off, hundreds of volts of the DC voltage Vbulk will be provided to the gate of the second switch 141 (EQ11) of the constant-current circuit 14 through the second resistor loop 131 of the constant-current drive circuit 13. However, since the constant-current drive circuit 13 has the second protection unit 132 (EZD16), the reverse breakdown voltage of the second protection unit 132 (EZD16) may be designed to be 15 volts so that the second protection unit 132 (EZD16) provides a stable voltage of 15 volts as the gate voltage that drives the second switch 141 (EQ11) to be turned on. Therefore, once the second switch 141 (EQ11) is turned on and then controls the third switch 142 (EQ12) to be turned on, the constant-current circuit 14 will enable constant-current discharge. That is, the constant-current discharge of the constant-current circuit 14 is activated so that the constant-current circuit 14 performs the constant-current discharge through the discharge path provided by the third switch 142 (EQ12) according to the magnitude of the discharge current. Therefore, the constant-current discharge disclosed in the present disclosure is an active constant-current discharge realized by controlling the transistor (power) switch.

In particular, the first resistor loop 121 of the voltage level adjustment circuit 12 includes at least one resistor ER16, ER17 for deciding the discharge current of the constant-current circuit 14. Specifically, since the second switch 141 (EQ11) is turned on so that the constant-current circuit 14 performs the constant-current discharge, the magnitude of the discharge current (Idis) is approximately the DC voltage Vbulk minus the collector-emitter voltage ($V_{CE,\ EQ12}$) of the third switch 142 (EQ12), and then divided by the resistance value of the first resistor loop 121, that is, Idis=(Vbulk−$V_{CE,\ EQ12}$)/(ER16+ER17). Therefore, the discharge current of the constant-current circuit 14 may be determined by designing the resistance value of at least one resistor ER16, ER17 of the first resistor loop 121, that is, when the resistance value of at least one resistor ER16, ER17 is larger, the discharge current is smaller; on the contrary, when the resistance value is smaller, the discharge current is larger. For example, if the sum of the resistance values of at least one resistor ER16, ER17 is 300 kΩ, the discharge current is about 1 mA. Incidentally, in one embodiment, the withstand voltage of at least one resistor ER16, ER17 may be, for example, but not limited to, a specification of 200 volts.

Figure 4:
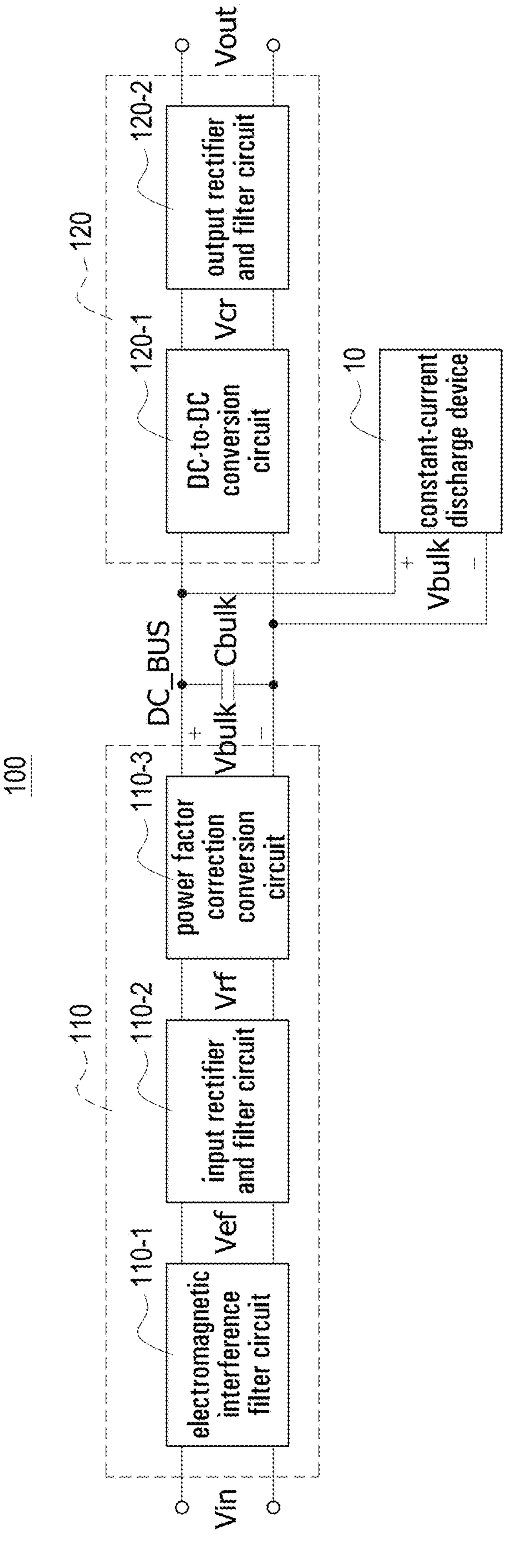
FIG. 4 is a block circuit diagram of a power supply having the constant-current discharge device according to the present disclosure.

Please refer to FIG. 4, which shows a block circuit diagram of a power supply having the constant-current discharge device according to the present disclosure. The power supply 100 receives an AC input voltage Vin and converts the AC input voltage Vin to provide a DC output voltage Vout. The power supply 100 includes an AC side circuit 110, a DC bus DC_BUS, a bus capacitor Cbulk, a DC side circuit 120, and a constant-current discharge device 10.

The AC side circuit 110 receives the AC input voltage Vin and converts the AC input voltage Vin into a DC voltage Vbulk. The AC side circuit 110 includes an electromagnetic interference filter circuit 110-1, an input rectifier and filter circuit 110-2, and a power factor correction conversion circuit 110-3. The electromagnetic interference filter circuit 110-1 receives the AC input voltage Vin and converts the AC input voltage Vin into a filtered voltage Vef. The input rectifier and filter circuit 110-2 is connected to the electromagnetic interference filter circuit 110-1, and the input rectifier and filter circuit 110-2 receives the filtered voltage Vef and converts the filtered voltage Vef into a rectified filtered voltage Vrf. The power factor correction conversion circuit 110-3 is connected to the input rectifier and filter circuit 110-2, and the power factor correction conversion circuit 110-3 converts the rectified filtered voltage Vrf into the DC voltage Vbulk.

The DC bus DC_BUS is connected to an output side of the AC side circuit 110. The bus capacitor Cbulk is connected to the DC bus DC_BUS, and builds the DC voltage Vbulk on the DC bus DC_BUS. The constant-current discharge device 10 is connected in parallel to the bus capacitor Cbulk and an input side of the DC side circuit 120, and the constant-current discharge device 10 receives the DC voltage Vbulk. The DC side circuit 120 includes a DC-to-DC conversion circuit 120-1 and an output rectifier and filter circuit 120-2. The DC-to-DC conversion circuit 120-1 receives the DC voltage Vbulk and converts the DC voltage Vbulk into a converted voltage Vcr. The output rectifier and filter circuit 120-2 is connected to the DC-to-DC conversion circuit 120-1, and the output rectifier and filter circuit 120-2 converts the converted voltage Vcr into the DC output voltage Vout.

When the DC voltage Vbulk is less than a voltage threshold Vth, the constant-current discharge device 10 discharges the energy stored in the bus capacitor Cbulk at a constant current. Please refer to FIG. 1, FIG. 2, and FIG. 3, when the power supply is shut down, or the input power of the power supply is powered off or continues abnormal power supply so that the DC voltage Vbulk gradually decreases from about 400 volts. Until the DC voltage Vbulk is less than the voltage threshold Vth (i.e., 300 volts), the constant-current circuit 14 enables the constant-current discharge, that is, the constant-current discharge of the constant-current circuit 14 is activated so that the constant-current circuit 14 performs the constant-current discharge according to the magnitude of the discharge current, thereby discharging the energy stored on the bus capacitor Cbulk at the constant current. In particular, the DC voltage Vbulk disclosed in this embodiment is a high voltage (about 400 volts), but it is not limited to a high voltage and may also be a low voltage, that is, the constant-current discharge device 10 of the present disclosure can be applied to high-voltage and low-voltage DC voltage Vbulk. As for the detailed operation of the constant-current discharge device 10 of the power supply 100, please refer to the previous description and will not be described again here.

Accordingly, the power supply with the constant-current discharge device of the present disclosure can reduce the discharge time of the bus capacitor Cbulk to less than 3 minutes compared with the power supply of the same specification in the prior art. Moreover, the constant-current discharge device uses its active constant-current discharge to enable the no-load loss to meet the specification requirements (<0.5 W) without affecting the conversion efficiency of the power supply itself.

In summary, the present disclosure has the following features and advantages:

1. The constant-current discharge device of the present disclosure can be applied to various power supplies for the purpose of discharging energy stored in capacitors.

2. The constant-current discharge device can be installed on an independent circuit board to form a modular design, and then connected in parallel to the DC bus of the power supply to provide the constant-current discharge.

3. The transistor (power) switch is the means by which active constant-current discharge is achieved, and the discharge current can be designed according to practical needs, and may be modified according to the specific requirements of the user.

4. By discharging the residual voltage on the capacitor, the risk of electric shock and electric shock to maintenance personnel or system operators is avoided, and component damage is avoided.

5. In comparison to the conventional manner, which requires a considerable amount of time (approximately 30 minutes) to complete the release of residual high voltage, the active constant-current discharge disclosed in the present disclosure can achieve complete energy release in a significantly shorter time (approximately 3 minutes).

6. The present disclosure offers the advantage of low loss (i.e., high efficiency) and high energy saving through the active constant-current discharge of the power supply.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A constant-current discharge device, comprising:

a discharge voltage detection circuit, connected between a positive terminal and a negative terminal of a DC voltage, and configured to receive the DC voltage;

a voltage level adjustment circuit, connected to the discharge voltage detection circuit, and the voltage level adjustment circuit configured to provide a supply voltage and decide a discharge current;

a constant-current drive circuit, connected to the discharge voltage detection circuit and the voltage level adjustment circuit, and the constant-current drive circuit configured to provide a drive voltage; and a constant-current circuit, connected to the voltage level adjustment circuit and the constant-current drive circuit, and the constant-current circuit supplied power by the supply voltage and driven by the drive voltage, wherein when the DC voltage is less than a voltage threshold, the constant-current circuit is configured to perform a constant-current discharge according to the discharge current, wherein the constant-current circuit comprises:

a first switch, connected to the voltage level adjustment circuit, and the first switch configured to receive the supply voltage; and a second switch, connected to the first switch, and wherein when the first switch is turned on, the second switch is configured to provide a discharge path so that the discharge current flows through the discharge path to perform the constant-current discharge.

2. The constant-current discharge device as claimed in claim 1, wherein when the DC voltage is greater than or equal to the voltage threshold, the constant-current circuit is configured to disable performing the constant-current discharge.

3. The constant-current discharge device as claimed in claim 1, wherein the discharge voltage detection circuit comprises:

a voltage-regulating unit, configured to receive the DC voltage and provide a regulated voltage;

a voltage-dividing unit, connected to the voltage-regulating unit, and the voltage-dividing unit configured to receive the regulated voltage and divide the regulated voltage to provide a divided voltage; and a third switch, connected to the voltage-dividing unit, and the third switch configured to receive the divided voltage and control the turning on and turning off of the third switch.

4. The constant-current discharge device as claimed in claim 3, wherein the discharge voltage detection circuit further comprises:

a first protection unit, connected to the voltage-dividing unit, and the first protection unit configured to receive the divided voltage and regulate the divided voltage to protect the third switch.

5. The constant-current discharge device as claimed in claim 1, wherein the voltage level adjustment circuit comprises:

a first resistor loop, comprising at least one resistor, and connected between the discharge voltage detection circuit and the constant-current circuit, and the first resistor loop configured to receive the DC voltage, adjust the supply voltage, and decide the discharge current.

6. The constant-current discharge device as claimed in claim 1, wherein the constant-current drive circuit comprises:

a second resistor loop, comprising at least one resistor, and configured to provide the drive voltage of driving the constant-current circuit.

7. The constant-current discharge device as claimed in claim 6, wherein the constant-current drive circuit further comprises:

a second protection unit, connected to the second resistor loop, and the second protection unit configured to protect the constant-current circuit.

* * * * *